US011798061B2

(12) United States Patent
Shao et al.

(10) Patent No.: US 11,798,061 B2
(45) Date of Patent: Oct. 24, 2023

(54) METHOD AND INTERNET OF THINGS SYSTEM OF CHARGING SERVICE FOR NEW ENERGY VEHICLE IN SMART CITY

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Bin Liu, Chengdu (CN); Yongzeng Liang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/051,883

(22) Filed: Nov. 2, 2022

(65) Prior Publication Data

US 2023/0087199 A1 Mar. 23, 2023

(30) Foreign Application Priority Data

Oct. 14, 2022 (CN) .......................... 202211257480.0

(51) Int. Cl.
*H04L 67/52* (2022.01)
*H04L 67/12* (2022.01)
(Continued)

(52) U.S. Cl.
CPC ......... *G06Q 30/0631* (2013.01); *H04L 67/12* (2013.01); *H04L 67/52* (2022.05); *G16Y 10/40* (2020.01)

(58) Field of Classification Search
CPC .......................... G06Q 30/0631; G16Y 10/40
(Continued)

(56) References Cited

U.S. PATENT DOCUMENTS 11,444,338 B1 * 9/2022 Dhawan .............. H01M 50/569
11,633,103 B1 * 4/2023 Nudd .................... A61B 5/0022
704/9
(Continued)

FOREIGN PATENT DOCUMENTS

CN 107563534 A 1/2018
CN 108983638 A 12/2018
(Continued)

OTHER PUBLICATIONS

Payam et al., "On Searching the Internet of Things: Requirements and Challenges," 2016, vol. 31, Publisher: IEEE.*
(Continued)

*Primary Examiner* — Tuan C To
(74) *Attorney, Agent, or Firm* — METIS IP LLC

(57) ABSTRACT

The present disclosure provides a method of charging service for a new energy vehicle in a smart city. This method is executed by a charging pile management platform. This method includes: based on the service platform, obtaining a charging request of a user by the user platform, wherein the charging request comprises a remaining power of a vehicle of the user and a position of the user; based on the charging request, determining candidate charging piles; based on queuing information of the candidate charging piles and time information for going to the candidate charging piles, sorting the candidate charging piles to determine an object charging pile; predicting a failure rate of the object charging pile, wherein the failure rate is used to determine recommendation information of the object charging pile; and based on the service platform, feeding back the recommendation information to the user through the user platform.

7 Claims, 6 Drawing Sheets

(51) Int. Cl.
*G06Q 30/0601* (2023.01)
*G16Y 10/40* (2020.01)

(58) Field of Classification Search
USPC .......................................................... 701/22
See application file for complete search history.

(56) References Cited

U.S. PATENT DOCUMENTS

| | | | |
|---|---|---|---|
| 11,676,219 B2* | 6/2023 | Cella | G06Q 30/0215 705/38 |
| 2020/0030982 A1 | 1/2020 | Xiong et al. | |
| 2022/0164603 A1* | 5/2022 | Zhou | G06N 3/08 |
| 2022/0340049 A1* | 10/2022 | Ju | B60N 2/0244 |
| 2022/0351366 A1* | 11/2022 | Sharma | G06V 20/698 |
| 2022/0368163 A1* | 11/2022 | Paduvalli | H02J 50/20 |
| 2023/0173949 A1* | 6/2023 | Cronin | H02J 7/0048 701/22 |
| 2023/0187954 A1* | 6/2023 | Cronin | H02J 7/0063 307/10.1 |
| 2023/0192063 A1* | 6/2023 | Cronin | B60W 10/26 701/22 |

FOREIGN PATENT DOCUMENTS

| | | | | | |
|---|---|---|---|---|---|
| CN | 109649211 A | 4/2019 | | | |
| CN | 110738432 A | 1/2020 | | | |
| CN | 112115350 A | 12/2020 | | | |
| CN | 112193112 A | 1/2021 | | | |
| CN | 112712800 A | 4/2021 | | | |
| CN | 113071350 A | 7/2021 | | | |
| CN | 113486261 A | 10/2021 | | | |
| CN | 113837473 A | 12/2021 | | | |
| CN | 114298770 A | 4/2022 | | | |
| CN | 114390079 A | 4/2022 | | | |
| CN | 114492169 A | 5/2022 | | | |
| CN | 114581180 A | 6/2022 | | | |
| CN | 114655057 A | 6/2022 | | | |
| CN | 114757411 A | 7/2022 | | | |
| CN | 114970693 A | 8/2022 | | | |
| WO | WO-2016118979 A2 * | 7/2016 | ........... | G06F 16/254 |
| WO | WO-2020181010 A1 * | 9/2020 | ........... | A61B 5/0004 |

OTHER PUBLICATIONS

First Office Action in Chinese Application No. 202211257480.0 dated Dec. 2, 2022, 21 pages.

Xu, Lin et al., Design of Intelligent Electric Vehicle Charging Service Platform, Computer Era, 24-26, 2017.

Kuangtu, Shangqing et al., New Energy Charging Pile Shared Charging Management Scheme Based on Blockchain, Information Technology and Network Security, 40(3): 60-66+71, 2021.

Bu, Fanpeng et al., Recommendation Method for Electric Vehicle Charging Based on Collaborative Filtering, Science & Technology Review, 35(21): 61-67, 2017.

Chen, Lixing et al., A Study on Coordinated Optimization of Electric Vehicle Charging and Charging Pile Selection, Energies, 2018, 16 pages.

Decision to grant a patent in Chinese Application No. 202211257480.0 dated Jan. 5, 2023, 7 pages.

* cited by examiner

METHOD AND INTERNET OF THINGS SYSTEM OF CHARGING SERVICE FOR NEW ENERGY VEHICLE IN SMART CITY

CROSS-REFERENCE TO RELATED APPLICATIONS

This application claims priority to Chinese Patent Application No. CN202211257480.0, filed on Oct. 14, 2022, the entire contents of which are hereby incorporated by reference.

TECHNICAL FIELD

The present disclosure involves the field of new energy vehicle services and especially involves a method and Internet of Things (IoT) system of charging service for a new energy vehicle in a smart city.

BACKGROUND

Vehicle is commonly used in travel. With the development of new energy technology, new energy vehicles have gradually entered the travel market. New energy vehicles need to be charged. At present, the charging method of new energy vehicles mainly relies on public charging piles on the streets, which sometimes require a long queue to start charging. In addition, there is the possibility of charging pile failure, which causes inconvenience to the user's travel.

Therefore, it is hoped to provide a method and IoT system of charging service for a new energy vehicle in a smart city, which can choose the best charging pile for users, improve the quality of new energy vehicle charging services, reduce the waiting time for users to queue up, and improve the physical examination of users.

SUMMARY

One or more embodiments of the present disclosure provide a method of charging service for a new energy vehicle in a smart city, which is realized by an Internet of Things (IoT) system of charging service for a new energy vehicle in a smart city. The IoT system of charging service for a new energy vehicle in a smart city includes a user platform, a service platform, and a charging pile management platform; the method is executed by the charging pile management platform. The method includes: based on the service platform, obtaining a charging request of a user by the user platform, wherein the charging request comprises a remaining power of a vehicle of the user and a position of the user; based on the charging request, determining candidate charging piles; based on the queuing information of the candidate charging piles and time information for going to the candidate charging piles, sorting the candidate charging piles to determine an object charging pile; predicting a failure rate of the object charging pile, wherein the failure rate is used to determine recommendation information of the object charging pile; and based on the service platform, feeding back the recommendation information to the user through the user platform.

One of the embodiments of the present disclosure provide an IoT system of charging service for a new energy vehicle in a smart city, including a user platform, a service platform, and a charging pile management platform. The charging pile management platform is configured to perform the following operations: based on the service platform, obtaining a charging request of a user by the user platform, wherein the charging request comprises a remaining power of a vehicle of the user and a position of the user; based on the charging request, determining candidate charging piles; based on the queuing information of the candidate charging piles and time information for going to the candidate charging piles, sorting the candidate charging piles to determine an object charging pile; predicting a failure rate of the object charging pile, wherein the failure rate is used to determine recommendation information of the object charging pile; and based on the service platform, feeding back the recommendation information to the user through the user platform.

One of the embodiments of the present disclosure provides a computer-readable storage medium, which stores computer instructions, when the computer reads the computer instructions in the storage medium, the computer executes the method of charging service for a new energy vehicle in a smart city.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
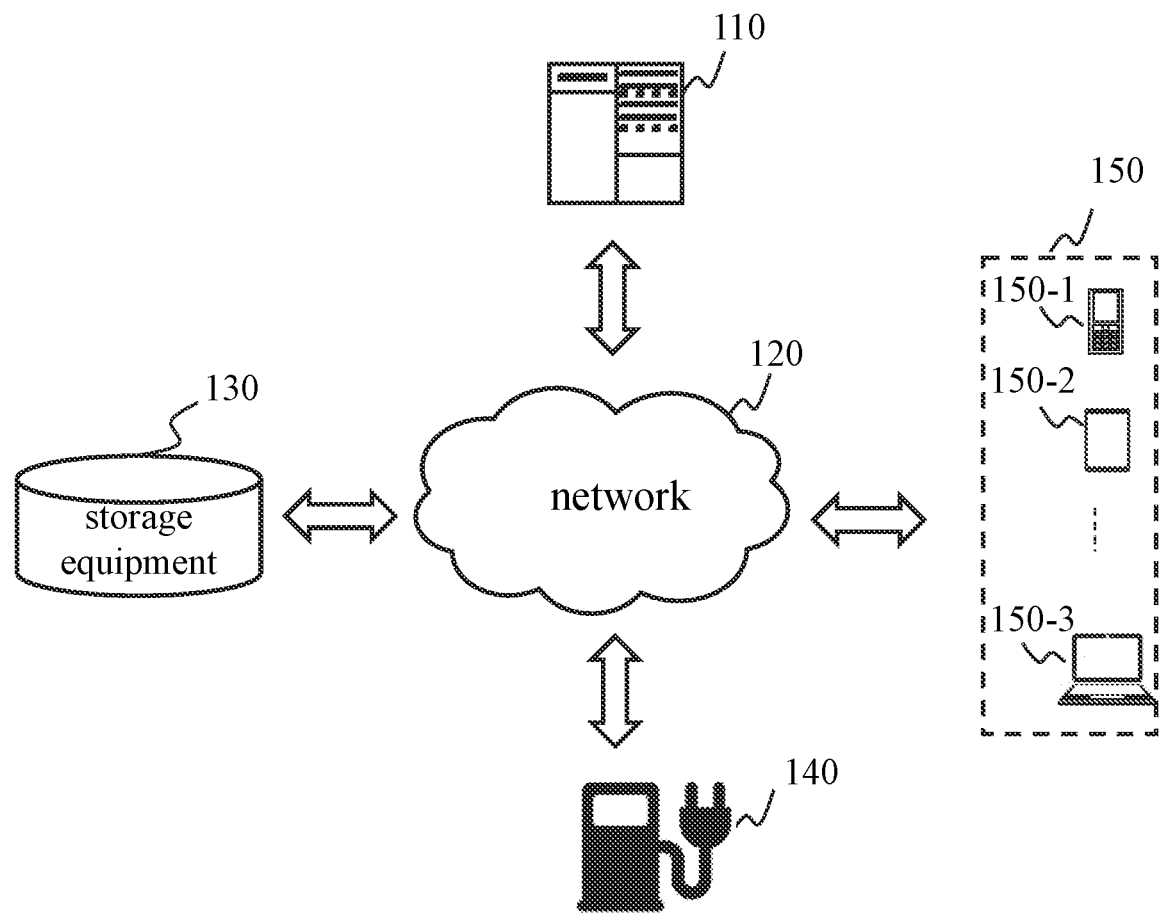
FIG. 1 is a schematic diagram of the application scenario of the IoT system of charging service for a new energy vehicle in a smart city according to some embodiments of the present disclosure.

In the following detailed description, numerous specific details are set forth by way of examples in order to provide a thorough understanding of the relevant disclosure. Obviously, the drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It should be understood that the terms "system," "device," "unit," and/or "module" used herein are one method to distinguish different components, elements, parts, sections, or assemblies of different levels. However, the terms may be displaced by another expression if they achieve the same purpose. As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram of the application scenario of the IoT system of charging service for a new energy vehicle in a smart city according to some embodiments of the present disclosure. In some embodiments, application scenario 100 can include processing equipment 110, network 120, storage equipment 130, charging pile 140, and terminal 150.

In some embodiments, components in application scenarios 100 can be connected and/or communicate with each other through network 120. For example, the processing equipment 110 can be connected to the storage equipment 130 through network 120.

In some embodiments, the processing equipment 110 can handle information and/or data related to the application scenario 100 of the IoT system of charging service for a new energy vehicle in a smart city, and perform one or more functions described in the present disclosure. For example, the processing equipment 110 can determine the candidate charging piles based on the charging request. In some embodiments, the processing equipment 110 may include one or more processing engines. Processing equipment 110 can process the data, information, and/or processing results obtained from other devices or system components, and perform program instructions based on these data, information, and/or processing results to perform one or more functions described in the present disclosure.

Network 120 may include any suitable network that provides information and/or data exchange capable of facilitating the IoT system of charging services for new energy vehicles in a smart city. One or more components of the IoT system of charging service for a new energy vehicle in a smart city can exchange information and/or data through network 120. For example, network 120 can feedback the recommendation information to users through the user platform based on the service platform.

Storage equipment 130 can be used to store data, instructions, and/or any other information. In some embodiments, the storage equipment 130 can store data and/or information obtained from processing equipment 110 and terminal 150. For example, storage equipment 130 can store charging requests, recommend information, etc. In some embodiments, the storage equipment 130 can be set in the processing equipment 110.

The charging pile 140 can refer to a charging pile that can provide users with a charging service. For example, charging pile 140 may include multiple charging piles located in different regions.

Terminal 150 can be a terminal device used by users. In some embodiments, terminal 150 may include mobile device 150-1, tablet 150-2, laptop 150-3 or its arbitrary combination. Mobile device 150-1 can interact with other components in the service platform through network 120.

Figure 2:
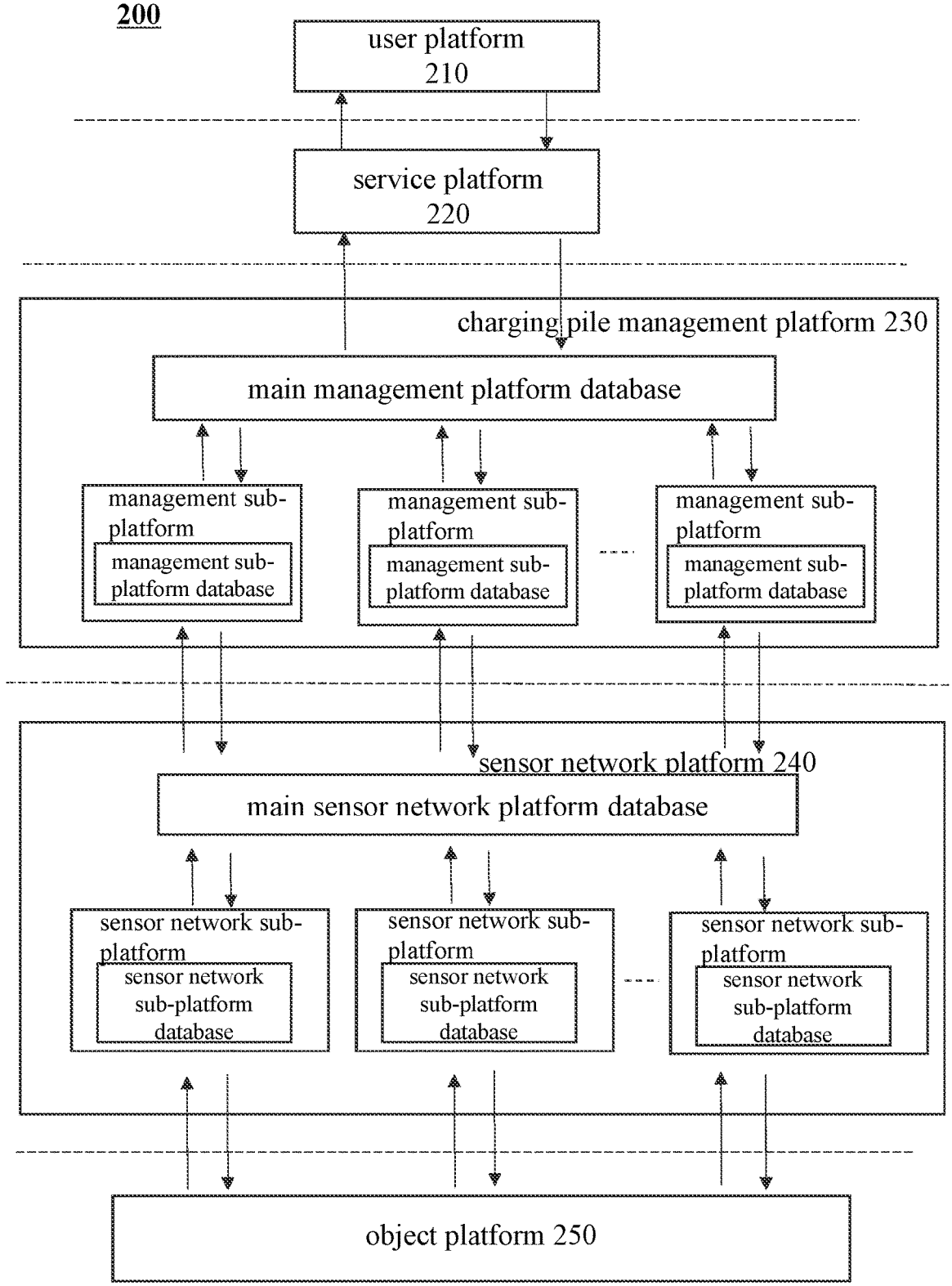
FIG. 2 is a schematic diagram of the IoT system of charging service for a new energy vehicle in a smart city according to some embodiments of the present disclosure.

FIG. 2 is a schematic diagram of the IoT system of charging service for a new energy vehicle in a smart city according to some embodiments of the present disclosure. As shown in FIG. 2, the IoT system 200 includes user platform 210, service platform 220, charging pile management platform 230, sensor network platform 240, and object platform 250.

In some embodiments, users can enter the charging request through the user platform 210. The user platform can feedback the recommendation information about the object charging pile to the user. User platform 210 can interact with the service platform 220. For example, issuing the user's charging request instruction to the service platform 220, and receiving the recommendation information of the object charging pile uploaded by the service platform 220.

In some embodiments, the service platform 220 can interact with the charging pile management platform 230. For example, issuing the charging request instruction of the user to the charging pile management platform 230, and receiving the recommendation information of the target charging pile uploaded by the charging pile management platform 230. Service Platform 220 can interact with user platform 210. For example, receiving the user's charging request instruction issued by the user platform 210, and uploading the recommendation information of the object charging pile to the user platform 210.

In some embodiments, the charging pile management platform 230 can include a main management platform database and multiple management sub-platforms (including its own management sub-platform database). A plurality of management sub-platforms store and process different types of data sent by the sensor network platform 240, respectively. The main management platform database summarizes and processes the data of multiple management sub-platforms, and transmits data to the service platform 220.

In some embodiments, multiple management sub-platforms can be divided based on urban areas. Each management sub-platform receives the relevant information of charging piles in each area from the sensor network platform database, processing and operating the relevant information.

In some embodiments, the charging pile management platform 230 can interact with the sensor network platform 240. For example, receiving the relevant information of the corresponding charging piles processed in each area uploaded by the sensor network platform database, and issuing an instruction to obtain the relevant information of the charging piles in each area to the sensor network platform database.

In some embodiments, the charging pile management platform 230 can interact with the service platform 220. For example, receiving the charging request instructions of users issued by the service platform 220. The main management platform database can upload the summary data to the service platform.

In some embodiments, the charging pile management platform is configured to perform the following operations: based on the service platform, obtaining a charging request of a user by the user platform. based on the charging request, determining candidate charging piles; based on the queuing information of the candidate charging piles and the time information of going to the candidate charging piles, sorting the candidate charging piles to determine an object charging pile; predicting a failure rate of the object charging pile, wherein the failure rate is used to determine the recommendation information of the object charging pile; and based on the service platform, feeding back the recommendation information to the user through the user platform.

In some embodiments, the charging pile management platform is further configured to perform the operations: based on multiple management sub-platforms, determining the candidate charging piles by the of the main management platform database, sorting the candidate charging piles based on the queuing information of the candidate charging piles and the time information for going to the candidate charging piles, and determining an object charging piles In some embodiments, the charging pile management platform is further configured to perform the operations: obtaining the knowledge map; based on the knowledge map, determining the failure rate of the object charging pile.

In some embodiments, the charging pile management platform is further configured to perform the operations: obtaining the first basic information of the candidate charging piles and the user's charging portrait; based on at least one of the queuing information, time information, the first basic information, and the charging portraits, determining a sorting result through a sorting model; based on the sorting result, determining the object charging pile.

In some embodiments, the charging pile management platform is further configured to perform the following operations: based on the travel demand information, determining first sub-recommendation information; based on the failure rate, determining second sub-recommendation information; based on the first sub-recommendation information and the second sub-recommendation information, determining the recommendation information.

In some embodiments, the sensor network platform 240 can include a main sensor network platform database and multiple sensor network sub-platforms (including their own databases). Multiple sensor network sub-platforms can store and process data from different types or different receiving objects sent by the object platform 250 respectively. The main sensor network platform database can aggregate the data of multiple sensor network sub-platforms, store and process the data, and transmit the data to the charging pile management platform 230. The relevant information of the charging piles can directly be sent to the corresponding sensor network sub-platform for processing and operation management.

In some embodiments, the sensor network platform 240 can interact with the object platform 250. The sensor network sub-platform obtains the relevant information about the charging piles deployed in various cities. For example, receiving the relevant information of the charging piles uploaded by the object platform 250, and issuing the instructions of obtaining the relevant information of charging piles in each region to the object platform. The sensor network platform 240 can interact with the charging pile management platform 230. For example, receiving the instructions of obtaining related information of charging piles in regions issued by the charging pile management platform. For another example, uploading the related information of the charging piles in the corresponding area of the main sensor network platform database to each corresponding management sub-platform. The sensor network sub-platforms can be similar to multiple management sub-platforms and is divided according to urban areas. A plurality of management sub-platforms can correspond to the sensor network sub-platforms.

In some embodiments, the relevant information (or related information) of the charging pile is first processed by the sensor network sub-platform and then summarized in the main database, which can reduce the data processing pressure of the entire sensor network platform, avoid data messy, and cause large load operations.

In some embodiments, the object platform 250 can be configured as a charging pile. Object platform 250 can interact with sensor network platform 240. For example, receiving the instructions of obtaining relevant information of charging piles issued by the sensor network sub-platforms, and uploading relevant information of charging piles to the corresponding sensor network sub-platforms.

The object platform can be used to obtain information about charging piles. The relevant information of the charging piles is passed to multiple management sub-platforms based on the sensor network platform so that multiple management sub-platforms determine the candidate charging piles based on the relevant information of the charging piles.

Figure 3:
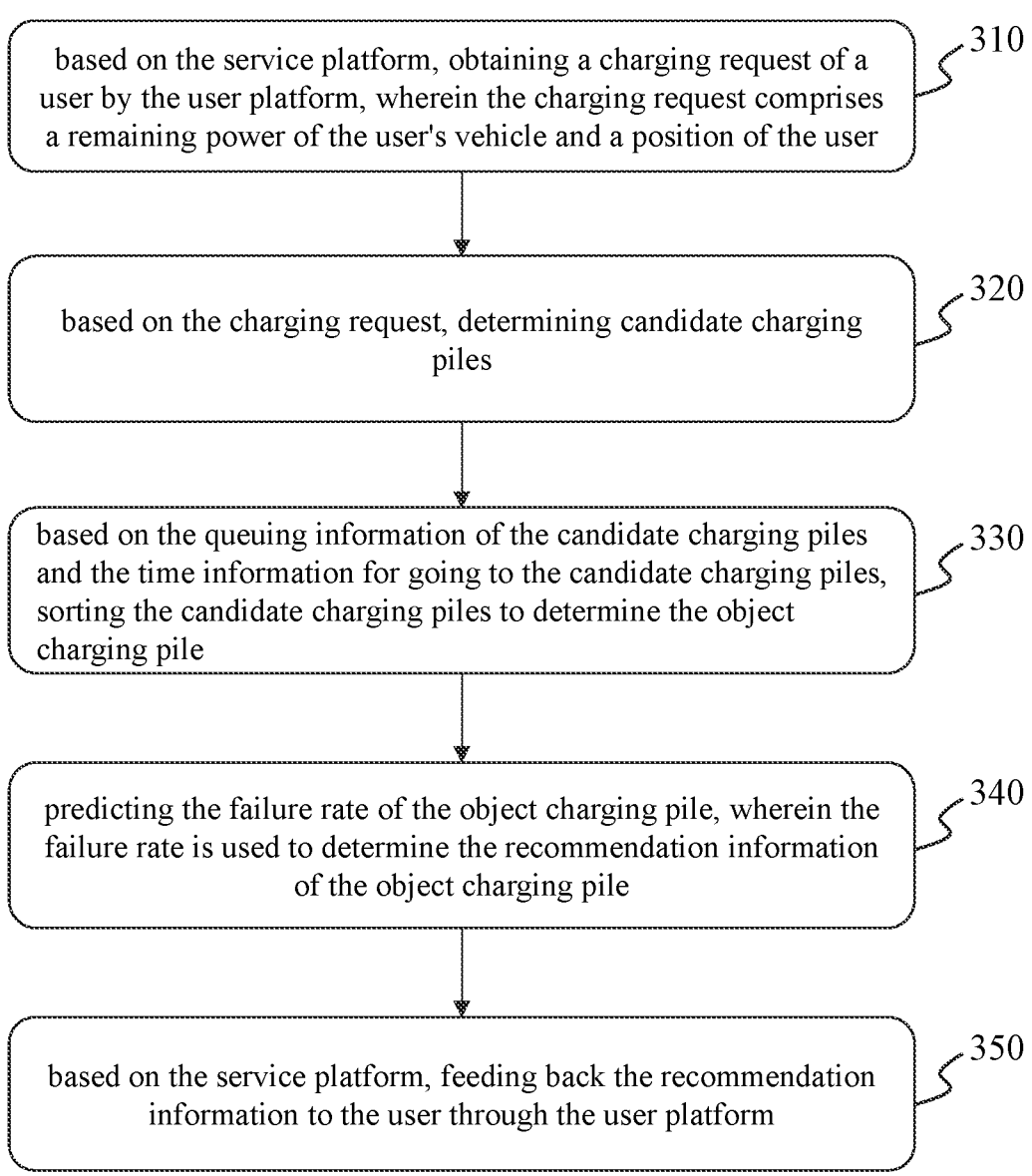
FIG. 3 is an exemplary flowchart of a method of charging service for a new energy vehicle in a smart city according to some embodiments of the present disclosure.

FIG. 3 is an exemplary flowchart of a method of charging service for a new energy vehicle in a smart city according to some embodiments of the present disclosure. In some embodiments, process 300 can be performed by the charging pile management platform 230.

Step 310, based on the service platform, obtaining a charging request of a user by the user platform, wherein the charging request comprises a remaining power of the user's vehicle and a position of the user.

A charging request refers to the user's request for the charging of the vehicle. The charging request can also include the remaining power of the user's vehicle and the positioning of the user. The remaining power can be displayed on the dashboard of the vehicle. The positioning can be obtained through the positioning devices such as GPS and the user terminal loaded by the vehicle.

In some embodiments, the service platform can obtain the user's charging request from the user platform in various ways. For example, the remaining power is less than the threshold, and the user platform can actively send a charging request to the service platform. The threshold can be preset by the user platform. For another example, the service platform can also obtain the charging request based on the user's charging request operation. For example, when the user sends a charging request to the service platform by clicking the operation button.

Step 320, based on the charging request, determining candidate charging piles.

The candidate charging pile refers to a charging pile at which the vehicle supported by a power determined by multiplying a remaining power of a vehicle of the user by a safety factor can arrive. The safety factor can be preset in advance, for example, the safety factor is 0.9.

In some embodiments, the charging pile management platform can determine the candidate charging piles based on multiple management sub-platforms, and pass the candidate charging piles to the management platform database through multiple management sub-platforms.

In some embodiments, the charging pile management platform can determine the candidate charging piles in various ways. For example, based on the user's charging request, determining the maximum position where the vehicle supported by a power determined by multiplying the remaining power of the vehicle by the safety factor can go, and determining the distribution of the candidate charging piles based on the maximum position.

In some embodiments, the charging pile management platform can also determine the candidate charging piles based on the historical user. For example, according to the position of the user, the number of charging piles of the historical selection of users within a certain range can be sorted. The charging piles that are similar to the charging piles that have been selected more times are determined as candidate charging piles.

Step 330, based on the queuing information of the candidate charging piles and the time information for going to the candidate charging piles, sorting the candidate charging piles to determine the object charging pile.

The queuing information can include current queuing vehicles, the estimated queuing time, and the power use of charging piles during the queuing process. In some embodiments, queuing information can be obtained according to a charging pile and other user terminals. The queuing information can be updated in real-time according to the actual queuing situation.

Time information refers to the time required to reach the position of the candidate charging piles from the user's current position. Time information can be determined according to information such as road traffic, remaining power of the vehicle, and vehicle models.

In some embodiments, candidate charging piles can be sorted in various ways. For example, candidate charging piles can be sorted from short to long according to time information. For another example, candidate charging piles can be sorted according to small to large according to queuing vehicles. For a detailed explanation of the sorting of the candidate charging piles, please see FIG. 5 and description thereof.

The object charging pile refers to a charging pile determined from the candidate charging piles and recommended to the user.

In some embodiments, the object charging pile can be determined in various ways. For example, according to the sorting results of the candidate charging piles, the top charging pile may be determined as the object charging pile. For another example, the object charging pile can be determined from the candidate charging piles according to the user's personalization. For more instructions for determining the object charging pile, please refer to FIG. 5 and the description thereof.

Step 340, predicting the failure rate of the object charging pile, wherein the failure rate is used to determine the recommendation information of the object charging pile.

The failure rate refers to the probability of failure in the charging pile. In some embodiments, the failure rate can be determined based on a model, use time, and the number of uses of the charging pile.

In some embodiments, the failure rate can be predicted in various ways. For example, the failure rate of the object charging pile can be predicted according to the failure of the same type of charging pile. For another example, the failure rate of the object charging pile can be predicted according to information such as the use time and the number of times the charging pile has failed historically. For a detailed description of predicting the failure rate of the target charging pile, please refer to FIG. 4.

Recommendation information refers to the recommendation information of the object charging pile. Recommendation information can include recommendation scores, a recommendation situation, etc. Recommendation information can be represented by numerical or text. The recommendation situation can be expressed as not recommended, general recommendation, recommendation, etc.

In some embodiments, recommendation information can be determined in various ways. For example, the failure rate is in negatively related to the recommendation information. The larger the failure rate, the lower the recommendation score. For more explanations to determine the recommendation information, please refer to FIG. 6.

Step 350, based on the service platform, feeding back the recommendation information to the user through the user platform.

In some embodiments, the service platform can send the recommendation information to the user platform. Then, the user platform may pass the recommendation information to the user terminal, and display the recommendation information on the user terminal.

Based on the method of charging service for a new energy vehicle, the appropriate charging pile is recommended to users, which can reduce the queuing time and avoid the failure of the charging pile as much as possible, so as to improve charging efficiency, meet charging needs, and improve users' travel experience.

Figure 4:
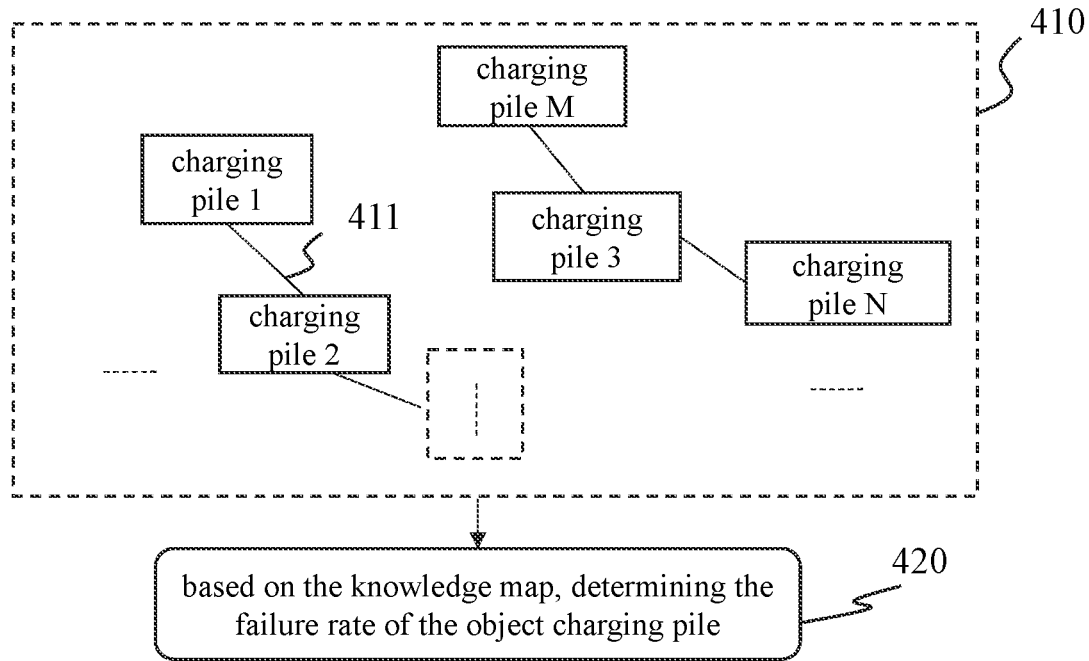
FIG. 4 is an exemplary schematic diagram of determining a failure rate of an object charging pile based on a knowledge map according to some embodiments of the present disclosure.

FIG. 4 is an exemplary schematic diagram of determining a failure rate of an object charging pile based on a knowledge map according to some embodiments of the present disclosure; In some embodiments, process 400 can be performed by the charging pile management platform 230.

Step 410, obtaining a knowledge map.

The knowledge map can reflect a characteristic of each charging pile and the relationship between charging piles.

In some embodiments, the knowledge map can include nodes and edges.

Nodes can include charging piles, etc. As shown in FIG. 4, the nodes include charging piles 1, 2, 3, M, N, etc. Node features can include the failure rates of the charging piles. An edge can be used to connect two nodes with a degree of similarity larger than the preset threshold. Similarity can refer to the degree of similarity between two nodes. The preset threshold can refer to the minimum value of similarity between two nodes.

The charging pile management platform can set the preset threshold and/or adjust the preset threshold according to actual needs. When the similarity between two nodes is larger than the preset threshold, there are an edge between the two nodes. As shown in FIG. 4, edge 411 exits between the charging pile 1 and 2 (a similarity larger than the preset threshold). The edge feature can include the similarity of the two nodes connected by the edge.

In some embodiments, the charging pile management platform 230 can obtain the knowledge map based on the relevant information of each charging pile. For example, based on the relevant information of each charging pile, the knowledge map may be obtained by connecting the charging piles with a degree of similarity larger than the preset threshold using edges. For more information about the relevant information on the charging pile, please refer to FIG. 3.

In some embodiments, the charging pile management platform can determine the similarity between the two nodes in various ways. For example, the charging pile management platform can determine the similarity between the two nodes based on the relevant information of each charging pile. The same or higher similar information in the relevant information of the two charging piles, the greater the similarity between the two nodes.

In some embodiments, the charging pile management platform can build a charging pile vector for each charging pile based on a manufacturer, a model, the use age, a charging period s, the number of times of faults of the charging pile. The charging pile management platform can determine the similarity between the two nodes based on the charging pile vector.

The relevant information of the charging pile may include the basic information, location information, historical failure information, historical charging information used by users, current queuing information, reservation information, and charging duration for the charging pile. The basic information of the charging pile may include a type, a model, a manufacturer, a failure rate, etc. The location information of the charging pile may include the location distribution of different charging piles. The charging pile can be configured with a label (such as ID number) according to a default rule to facilitate the management of the charging pile. In some embodiments, the charging pile includes a positioning device to obtain the location of the charging pile. The charging pile includes the camera device to collect real-time image information.

The relevant information of the charging pile can be represented by the charging pile vector.

In some embodiments, the management sub-platform can build the charging pile vector of each charging pile based on the relevant information of the charging pile. For more information on how the management sub-platform obtains relevant information about charging piles in different urban areas through the object platform based on the sensor network sub-platform, please refer to FIG. 2.

In some embodiments, the charging pile management platform can calculate a vector distance of any two charging pile vectors, and determine the similarity of any two charging piles based on the vector distance. Wherein, the vector distance can include a Cosine distance, the European distance, or the Hanying distance.

Determining similarity based on the charging pile vector can improve the accuracy of similarity, and thus, the best object charging pile can be selected for users to improve the user experience.

In some embodiments, the charging pile management platform can iteratively to update the knowledge map. Wherein, the update conditions of iteration can include regularly updating and/or charging pile failures. The iterative update can be performed by the formula of $x'=x+\Sigma a_i y_i$.

In some embodiments, the charging pile management platform can update the knowledge map when meeting the update conditions. The update conditions include regular or real-time updates, certain specific conditions, etc. The charging pile management platform can update the failure rates of the charging piles of all or part of the nodes in the knowledge map. For example, when a charging pile of a node fails, the failure rates of charging piles of nodes of the same type as the node can be updated. Some specific conditions may include failure of charging piles, scrapped charging piles, etc.

In some embodiments, the iterative update may be performed through equation (1).

$$x'=x+\Sigma a_i y_i \qquad (1)$$

wherein, x' is the failure rate after the update, x is the failure rate before the update, yi is the fault rate of the neighbor node, and ai is the similarity between the neighbor node and the charging pile node. The neighbor node may refer to a node connected to the charging pile node. The neighbor can be understood as the number of edges involved in the shortest path between the two nodes. For example, neighbors can be 1, 2, etc.

As shown in FIG. 4, the neighbor between the charging pile M and the 3 is 1. The neighbor between the charging pile M and N is 2. The size of the neighbor can be preset. When the neighbor is 2, the similarity ai between the neighbor node and the charging pile node may be determined based on the weighted summation of the similarity of the corresponding two edges, wherein the weights of the similarity of different edges may be preset.

In the first round of iteration, the failure rate before the update and the failure rate of the neighbor node can be determined in advance. For how to determine the fault rate, please refer to FIG. 3. The similarity between the neighbor node and the charging pile node can be preset.

For another example, the iterative update may be performed through equation (2):

$$x'=\alpha*x+\beta*\Sigma a_i y_i \qquad (2)$$

wherein, a is the weight coefficient corresponding to the failure rate before the update, $\beta$ is the weight coefficient corresponding to the products of the failure rate of the neighbor node and the similarity between the neighbor node and the charging pile node. $\alpha$ and $\beta$ can be preset according to actual needs.

Through continuous iteration to update the knowledge map, the accuracy of the knowledge map can be ensured, and the accuracy of the failure rate of the object charging pile can be further ensured, which is conducive to further ensure the accuracy of the recommendation information and enhance the physical experience of users.

Step 420, based on the knowledge map, determining the failure rate of the object charging pile.

In some embodiments, the charging pile management platform can determine the failure rate of the object charging pile based on the characteristics of the nodes (or node characteristics, node features, features of nodes). For example, the charging pile management platform can determine the node characteristic (failure rate) corresponding to the object charging pile node in the knowledge map as the failure rate of the object charging pile. When the knowledge map is updated, the failure rate of the object charging pile is the failure rate after the update.

Based on the knowledge map, determining the failure rate of the object charging pile can improve the accuracy of the failure rate, which is conducive to ensuring the accuracy of the recommendation information and improving the physical examination of users.

Figure 5:
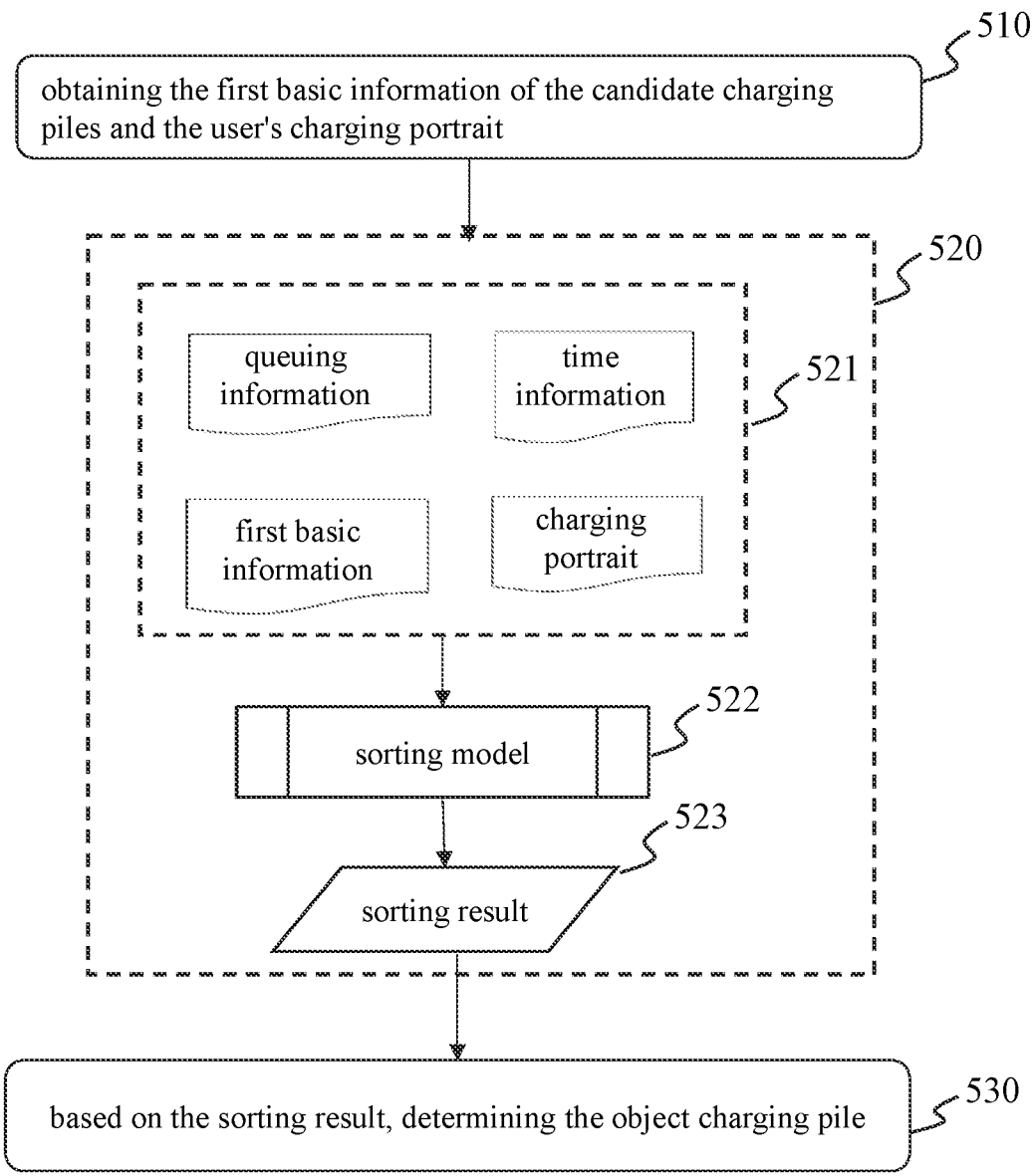
FIG. 5 is a flowchart of a process of determining object charging pile based on sorted result according to some embodiments of the present disclosure.

FIG. 5 is a flowchart of a process of determining object charging pile based on sorted result according to some embodiments of the present disclosure. In some embodiments, process 500 can be performed by the charging pile management platform 230.

Step 510, obtaining the first basic information of the candidate charging piles and the user's charging portrait.

The first basic information can reflect information related to the candidate charging piles. The first basic information can include the manufacturers of the charging piles, the models of the charging piles, and the locations of the charging piles.

The user's charging portrait refers to the information on the user's tendency to choose a charging pile. For example, the user's charging portrait may include information represented by the user's historical charging behavior, information on which charging pile the user tends to choose, and the like.

In some embodiments, the charging pile management platform can obtain the first basic information in various ways. For example, the first basic information can be obtained through the ID corresponding to the candidate charging pile, and then through the corresponding management sub-platform database.

In some embodiments, the charging pile management platform can obtain user's historical charging data through multiple management sub-platform databases. The charging pile management platform can count the historical charging data of users. The charging pile management platform can determine the statistical data as a user's charging portrait.

In some embodiments, the user's charging portrait can be represented by user feature vectors.

In some embodiments, the charging pile management platform can obtain the second basic information and the historical charging data of the user. The charging pile management platform can extract user feature vectors based on the second basic information and historical charging data. The feature extraction model is a machine learning model.

The second basic information can refer to information related to the user. For example, the model of user's new energy vehicle, and the habit of choosing a charging pile.

In some embodiments, the charging pile management platform can obtain the user's second basic information in various ways. For example, the management sub-platform database stores the second basic information of the user. The charging pile management platform can determine the user's second basic information through the ID corresponding to the user.

User feature vectors can represent the characteristics related to the vehicle charging of a user.

The feature extraction model can be a machine learning model. The type of the feature extraction model can include a neural network, a deep neural network, a convolutional neural network, etc. The selection of model types depends on the specific situation.

In some embodiments, the input of the feature extraction model can include the user's second basic information and the historical charging data of the user. The output of the feature extraction model can include user feature vectors.

In some embodiments, the feature extraction model can be trained based on multiple groups of training samples and labels. Each group of training samples includes the second basic information of the sample users and the historical charging data of the sample users. The labels may include sample user feature vectors of the user. Training data can be obtained based on historical data, and the labels of the training data can be determined by manual labeling or automatic labeling.

In some embodiments, the training process of the feature extraction model may include obtaining the feature extraction model based on a prediction model. The prediction model includes the feature extract layer and the judgment layer. Based on the first user feature vector of the first user and the second user feature vector corresponding to the second user output by the feature extraction layer, the judgment layer determines the similarity of the charging piles selected by the first user and the second user.

The prediction model refers to a model that can predict the similarity of charging piles selected by the two users based on the relevant information of the two users. The prediction model can be a machine learning model.

The feature extraction layer can extract user feature vectors based on the second basic information and historical charging data. For example, the feature extraction layer can output the first user feature vector based on the second basic information and historical charging data of the first user; and output the second user feature vector based on the second basic information and historical charging data of the second user. The judgment layer can determine the similarity between the charging piles selected by the two users based on the user feature vector corresponding to the two users. In some embodiments, the prediction model can be similar to the sorting model, for example, the deep neural network model. For more instructions on the sorting model, please refer to step 520.

In some embodiments, the feature extraction model may be obtained by training the prediction model based on training samples and labels. For example, after the combined training of the feature extraction layer and the judgment layer, the trained feature extraction layer can be determined as a feature extraction model.

In some embodiments, the training samples can be divided into two groups. The first group of training samples includes multiple pairs of training data. Each pair of training data corresponds to the second basic information and historical charging data of two users who initiate charging requests at similar locations (such as 1 km). The label is the similarity of the charging piles selected after the two users initiate the charging request. The second group of training samples includes multiple pairs of training data. Each pair of training data is the second basic information and historical charging data of the two users with the similarity between the second basic information of the two users greater than a similarity threshold. The label is the similarity of the charging piles selected at the time after the historical charging data of the two users.

By training at different groups, the accuracy and training efficiency of the feature extraction model can be improved. The training results of the prediction model can ensure that the feature vector of the feature extraction model output is related to the user's charging portrait.

Extracting user feature vectors through feature extraction models can improve the accuracy of user feature vectors, which can ensure the accuracy of the user's charging portrait, and is conducive to ensuring the accuracy of the determined object charging pile.

Step 520, based on at least one of the queuing information, time information, first basic information, and charging portrait, determining the sorting result through the sorting model, wherein the sorting model is a machine learning model.

Sorting model 522 refers to the sorting model of sorting candidate charging piles for the user. Sorting models can be a machine learning model. In some embodiments, the types of sorting models may include neural networks, deep neural networks, convolutional neural networks, etc. The selection of model types depends on the specific situation.

In some embodiments, the input 521 of the sorting model may include at least one of the queuing information of the candidate charging pile, the time information of the candidate charging pile, the first basic information of the candidate charging pile, and the user's charging portrait. The output of the sorting model can include sorting result 523.

In some embodiments, the sorting model can include the first feature extraction layer and sorting layer.

In some embodiments, the input of the first feature extraction layer can include at least one of the queuing information, time information, first basic information, and charging portraits. The output of the first feature extraction layer can include the characteristics of candidate charging piles and user features. The above features can be represented by feature vectors. For example, user features can be represented by user feature vectors. For more information about user feature vectors, please refer to step 510.

In some embodiments, the input of the sorting layer can include candidate charging pile features and user features. The output of the sorting layer may include the sorting result.

In some embodiments, based on multiple groups of training samples and labels, the first feature extraction layer and judgment layer are jointly trained to obtain the sorting model.

In some embodiments, each group of training samples includes at least one of the sample queuing information, sample time information, sample first basic information, and sample charging portraits. The labels are the sample sorting results. Training data can be obtained based on historical data, and the labels of the training data can be determined by manual labeling or automatic labeling.

Step 530, based on the sorting result, determining the object charging pile.

In some embodiments, the charging pile management platform can determine the object charging pile based on the sorting result. For example, the top candidate charging piles in the sorting result can be determined as an object charging pile.

Through the sorting model determining the object charging pile, the accuracy of the determined object charging pile can be improved, the accuracy of the subsequent determined recommendation information can be further ensured, and the user experience can be improved.

Figure 6:
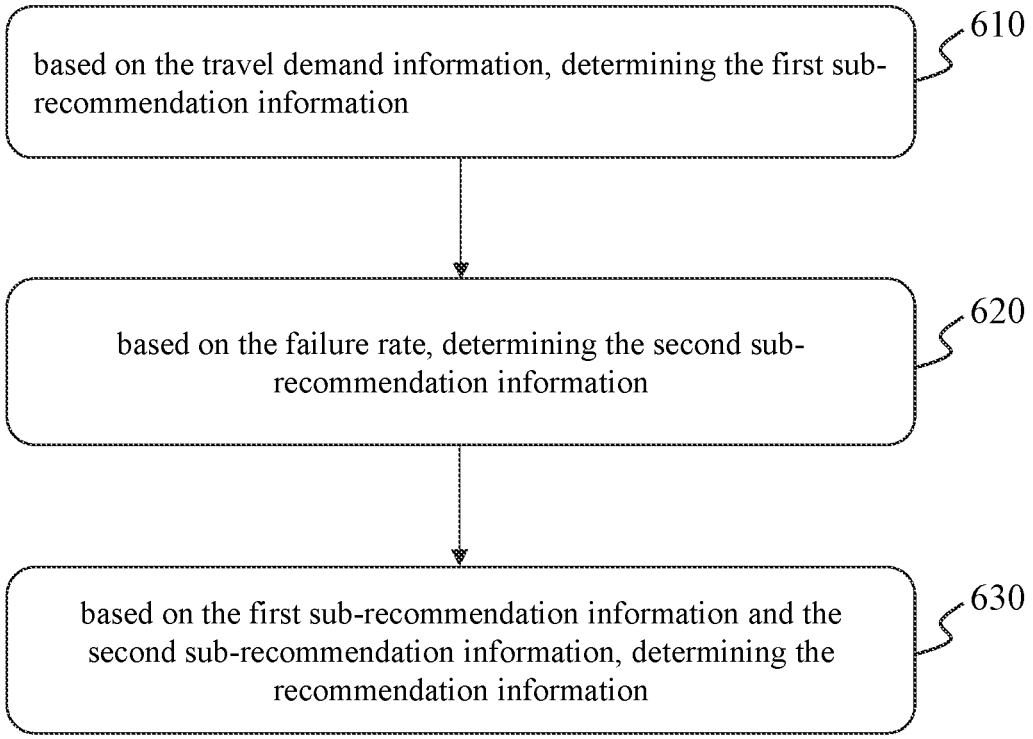
FIG. 6 is a flowchart of a process of determining the recommendation information according to some embodiments of the present disclosure.

FIG. 6 is a flowchart of a process of determining the recommendation information according to some embodiments of the present disclosure. In some embodiments, process 600 can be performed by the charging pile management platform 230.

Step 610, based on the travel demand information, determining the first sub-recommendation information.

The travel demand information refers to information relating to the user's travel demand. The travel demand information can include information such as a destination and an expected travel time. For example, the travel demand information can be to go to location A to eat, shop, go to a certain hospital, or hope to reach the destination within half an hour or before nine o'clock.

The first sub-recommendation information refers to the recommendation information related to the travel demand. For example, the first sub-recommendation information can include the situation that the object charging pile meets the travel demand (such as the distance of the object charging pile from position A).

In some embodiments, the charging pile management platform can determine the first sub-recommendation information based on the travel demand information. For example, if the travel demand information is to eat at position A, the charging pile management platform can determine the first sub-recommendation information according to the distance between position A and the object charging pile. The recommendation score of the object charging pile 1 closer to position A is higher (such as 90), and the recommendation score of the object charging pile 2 far from position A is lower (such as 70).

In some embodiments, the charging pile management platform can process the travel demand information as well as the location information, and the environmental information of the object charging pile based on the recommendation model to determine the first sub-recommendation information. The recommendation model is a machine learning model.

Location information and environmental information refer to the location information and environmental information of the object charging pile. The environmental information may include information such as the flow of people around the object charging pile, the traffic complexity, and road facilities.

The recommendation model is used to determine the first sub-recommendation information of the object charging pile. In some embodiments, the input of the recommendation model can include travel demand information, the location information and environmental information of the object charging pile. The output of the recommendation model can be the first sub-recommendation information. In some embodiments, the recommendation model can include multiple input layers and one output layer. Different input layers are used to process different input information. The output of each input layer is the feature vector corresponding to the input information, respectively. The input of the output layer is multiple feature vectors corresponding to multiple input information and the output of the output layer is the first sub-recommendation information.

In some embodiments, multiple input layers and an output layer can be trained separately.

In some embodiments, the training data of multiple input layers can be the training samples of multiple groups with labels. Training samples can be sample travel demand information, the location information or environment information of historical sample object charging piles. Training samples can be obtained based on historical data. The labels of the training samples of multiple input layers are the travel feature vector or location feature vector or environmental feature vector. The labels can be obtained through the historical feature vectors stored in the storage device, or by manual labeling.

In some embodiments, the training data of the output layer can be training samples of multiple groups with labels. Training samples can be sample travel feature vectors, sample location feature vectors, and environmental feature vectors. The training samples can be derived from the above feature vectors stored in the storage device. The labels of the training samples of the output layer include the first sample sub-recommendation information.

In some embodiments, multiple input layers and an output layer can be obtained through joint training.

In some embodiments, multiple input layers and an output layer may be trained based on a large number of training data with labels. The parameters of multiple input layers and one output layer are updated through training, and when the trained model satisfies the preset conditions, multiple trained input layers and one output layer may be obtained. Wherein, the preset conditions can be that the loss function is less than the threshold, convergence, or the training cycle reaches a threshold.

Determining the first sub-recommendation information according to the recommendation model can make the first sub-recommendation information more in line with the needs of the user, and improve the accuracy of determining the object charging pile.

Step 620, based on the failure rate, determining the second sub-recommendation information.

The second sub-recommendation information refers to the recommendation information related to the failure rate.

In some embodiments, the charging pile management platform can determine the second sub-recommendation information according to the failure rate of the object charging pile. For example, the second sub-recommendation information of the object charging pile 1 with a failure rate of 30% may be: a recommendation score of 65. For another example, the second sub-recommendation information with an object charging pile 2 with a failure rate of less than 5% may be: a recommendation score of 95.

Step 630, based on the first sub-recommendation information and the second sub-recommendation information, determining the recommendation information.

In some embodiments, the charging pile management platform can process the first sub-recommendation information and the second sub-recommendation information to determine the recommendation information. For example, the charging pile management platform can merge the first sub-recommendation information and the second sub-recommendation information, and determine the merged sub-recommendation information as the recommendation information. For example, the recommendation score of the first sub-recommendation information of the object charging pile 1 is 90, and the recommendation score of the second sub-recommendation information is 65. It can be determined that the recommendation information of object charging pile 1 is that: the recommended score is 90+65, the distance from position A is very close, the object charging pile is more likely to fail.

In some embodiments, the charging pile management platform can obtain the times of iterations of the knowledge map; based on the times of iterations, determine the first weight of the first sub-recommendation information and the second weight of the second sub-recommendation information; based on the first sub-recommendation information, the second sub-recommendation information, and the first weight and second weight, determine the recommendation information.

The times of iterations refer to the number of the times of iterations of the knowledge map. For detailed instructions on knowledge map and iterations, please refer to FIG. 4.

The first weight refers to the weight of the first sub-recommendation information. The second weight refers to the weight of the second sub-recommendation information. The weight reflects the importance of the first sub-recommendation information and the second sub-recommendation information in determining the recommendation information. In some embodiments, the first weight and second weight can be set in advance. With the increase in the number of times of iteration of the knowledge map, the second weight of the second sub-recommendation information has gradually increased.

In some embodiments, the recommendation information can be determined according to the weighted results of the first sub-recommendation information and the second sub-recommendation information. For example, the first recommendation information of the object charging pile 2 includes a recommendation score of 70 and the first weight of 0.7, the second sub-recommendation information includes the recommendation score of 95 and the second weight of 0.3, the weighted result is 77.5. The recommendation information about the object charging pile 2 is that: the recommendation score is 77.5, the distance is far, the object charging pile is not prone to fail.

By determining the recommendation information of the object charging pile according to the travel demand information and failure rate, a user can choose a more suitable object charging pile, thereby improving the experience.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Finally, it is to be understood that the embodiments of the present disclosure disclosed herein are illustrative of the principles of the embodiments of the present disclosure. Other modifications that may be employed may be within the scope of the application. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method of charging service for a new energy vehicle in a smart city, which is realized by an Internet of Things (IoT) system of charging service for a new energy vehicle in a smart city, the IoT system including a user platform, a service platform and a charging pile management platform; the method being executed by the charging pile management platform, the method comprising:

based on the service platform, obtaining a charging request of a user by the user platform, wherein the charging request comprises a remaining power of a vehicle of the user and a position of the user;

based on the charging request, determining candidate charging piles;

obtaining first basic information of the candidate charging piles and a charging portrait of the user; the charging portrait representing information of a tendency of the user to choose a charging pile; the charging portrait being a user feature vector obtained by extracting second basic information and historical charging data of the user based on a feature extraction model, wherein the feature extraction model is a machine learning model, the feature extraction model is obtained based on training a prediction model, and the prediction model is a machine learning model; wherein the prediction model includes a feature extraction layer and a judgment layer, the feature extraction layer outputs a first user feature vector based on second basic information and historical charging data of a first user; the feature extraction layer outputs a second user feature vector based on second basic information and historical charging data of a second user; and the judgment layer judges a similarity of charging piles selected by the first user and the second user based on the first user feature vector and the second user feature vector; and training samples for training the prediction model include a first group of training samples and a second group of training samples, the first group of training samples includes a plurality of pairs of first training data, and each of the pairs of first training data is second basic information and historical charging data corresponding to two users who initiate charging requests at similar locations, a label corresponding to the first training data is a similarity of charging piles selected by the two users after initiating the charging requests; the second group of training samples includes a plurality of pairs of second training data, each of the pairs of second training data is second basic information and historical charging data of two users whose similarity between the second basic information is greater than a similarity threshold, and a label of the second training data is a similarity of charging piles selected at a time after the historical charging data of the two users;

based on at least one of queuing information, time information, the first basic information, and the charging portrait, determining a sorting result through a sorting model, wherein the sorting model is a machine learning model;

based on the sorting result, determining an object charging pile;

predicting a failure rate of the object charging pile;

determining recommendation information of the object charging pile based on the failure rate; and based on the service platform, feeding back the recommendation information to the user through the user platform.

2. The method of claim 1, wherein predicting a failure rate of the object charging pile includes:

obtaining a knowledge map, wherein nodes of the knowledge map include charging piles, wherein a node feature of each node includes a failure rate of a charging pile corresponding to the node; an edge of the knowledge map is used to connect two nodes whose similarity is greater than a preset threshold; an edge feature of the edge comprises a similarity between the two nodes connected to the edge; and based on the knowledge map, determining the failure rate of the object charging pile.

3. The method of claim 1, wherein the charging request includes travel demand information, and the determining recommendation information of the object charging pile based on the failure rate includes:

based on the travel demand information, determining first sub-recommendation information;

based on the failure rate, determining second sub-recommendation information; and based on the first sub-recommendation information and the second sub-recommendation information, determining the recommendation information.

4. A non-transitory computer-readable storage medium comprising computer instructions, when the computer instructions are executed by a processor, the method for charging a new energy vehicle in a smart city according to claim 1 is implemented.

5. An Internet of Things (IoT) system of charging service for a new energy vehicle in a smart city, the IoT system comprising a user platform, a service platform and a charging pile management platform, the charging pile management platform being configured to perform the following operations comprising:

based on the service platform, obtaining a charging request of a user by the user platform, wherein the charging request comprises a remaining power of a vehicle of the user and a position of the user;

based on the charging request, determining candidate charging piles;

obtaining first basic information of the candidate charging piles and a charging portrait of the user; the charging portrait representing information of a tendency of the user to choose a charging pile; the charging portrait being a user feature vector obtained by extracting second basic information and historical charging data of the user based on a feature extraction model, wherein the feature extraction model is a machine learning model, the feature extraction model is obtained based on training a prediction model, and the prediction model is a machine learning model; wherein the prediction model includes a feature extraction layer and a judgment layer, the feature extraction layer outputs a first user feature vector based on second basic information and historical charging data of a first user; the feature extraction layer outputs a second user feature vector based on second basic information and historical charging data of a second user; and the judgment layer judges a similarity of charging piles selected by the first user and the second user based on the first user feature vector and the second user feature vector; and training samples for training the prediction model include a first group of training samples and a second group of training samples, the first group of training samples includes a plurality of pairs of first training data, and each of the pairs of first training data is second basic information and historical charging data corresponding to two users who initiate charging requests at similar locations, a label corresponding to the first training data is a similarity of charging piles selected by the two users after initiating the charging requests; the second group of training samples includes a plurality of pairs of second training data, each of the pairs of second training data is second basic information and historical charging data of two users whose similarity between the second basic information is greater than a similarity threshold, and a label of the second training data is a similarity of charging piles selected at a time after the historical charging data of the two users;

based on at least one of queuing information, time information, the first basic information, and the charging portrait, determining a sorting result through a sorting model, wherein the sorting model is a machine learning model;

based on the sorting result, determining an object charging pile;

predicting a failure rate of the object charging pile;

determining recommendation information of the object charging pile based on the failure rate; and based on the service platform, feeding back the recommendation information to the user through the user platform.

6. The IoT system of claim 5, wherein the charging pile management platform is further configured to perform the following operations including:

obtaining a knowledge map, wherein nodes of the knowledge map include charging piles, wherein a node feature of each node includes a failure rate of a charging pile corresponding to the node; an edge of the knowledge map is used to connect two nodes whose similarity is greater than a preset threshold; an edge feature of the edge comprises a similarity between the two nodes connected to the edge; and based on the knowledge map, determining the failure rate of the object charging pile.

7. The IoT system of claim 5, wherein the charging request includes travel demand information, and the charging pile management platform is further configured to perform the following operations including:

based on the travel demand information, determining first sub-recommendation information;

based on the failure rate, determining second sub-recommendation information; and based on the first sub-recommendation information and the second sub-recommendation information, determining the recommendation information.

* * * * *